United States Patent
Law et al.

(10) Patent No.: US 9,858,444 B2
(45) Date of Patent: Jan. 2, 2018

(54) SECURING A HUMAN INTERFACE DEVICE INPUT TO WIRELESS DISPLAY DEVICE

(71) Applicant: Dell Products L.P., Round Rock, TX (US)

(72) Inventors: Boon Kiat Law, Singapore (SG); Shohrab Sheikh, Singapore (SG); Siew Fei Lee, Singapore (SG)

(73) Assignee: Dell Products L.P., Round Rock, TX (US)

( * ) Notice: Subject to any disclaimer, the term of this patent is extended or adjusted under 35 U.S.C. 154(b) by 39 days.

(21) Appl. No.: 15/012,983

(22) Filed: Feb. 2, 2016

(65) Prior Publication Data

US 2017/0220823 A1    Aug. 3, 2017

(51) Int. Cl.
| | |
|---|---|
| *G06F 21/85* | (2013.01) |
| *G06F 21/60* | (2013.01) |
| *H04L 9/08* | (2006.01) |
| *H04W 12/02* | (2009.01) |

(52) U.S. Cl.
CPC ............ *G06F 21/85* (2013.01); *G06F 21/606* (2013.01); *H04L 9/0861* (2013.01); *H04W 12/02* (2013.01)

(58) Field of Classification Search
CPC ..... G06F 21/85; G06F 21/606; H04L 9/0861; H04W 12/02
See application file for complete search history.

(56) References Cited

U.S. PATENT DOCUMENTS

| 9,110,863 B2 | 8/2015 | Law et al. | |
|---|---|---|---|
| 2014/0122888 A1* | 5/2014 | Yoon ..................... | H04L 9/0844 713/171 |
| 2015/0172848 A1* | 6/2015 | Gao ....................... | H04W 4/008 455/41.3 |

OTHER PUBLICATIONS

ASUS, Miracast Dongle, https://www.asus.com/us/Phone-Accessory/ASUS_Miracast_Dongle/, printed Jan. 22, 2016.
Actiontec, http://www.shopactiontec.com/collections/frontpage, printed Jan. 22, 2016.
WiFi Alliance, WiFi Direct, http://www.wi-fi.org/discover-wi-fi/wi-fi-direct, printed Jan. 22, 2016.
WiFi Alliance, WiFi Protected Setup, http://www.wi-fi.org/discover-wi-fi/wi-fi-protected-setup, printed Jan. 22, 2016.
Webopedia, WPA2-PSK, http://www.webopedia.com/TERM/W/WPA2_PSK.html, printed Jan. 22, 2016.

* cited by examiner

*Primary Examiner* — Robert Leung
*Assistant Examiner* — Ayoub Alata
(74) *Attorney, Agent, or Firm* — Terrile, Cannatti, Chambers & Holland, LLP; Stephen A. Terrile

(57) ABSTRACT

A system, method, and computer-readable medium are disclosed for providing enhanced security to a wireless monitor, comprising: establishing a connection between the wireless monitor from a first device; generating a session identification for a human interface design (HID) input after the connection is established, the session identification enabling activities of an I/O device to be accepted by the wireless monitor; encrypting the activities of the I/O device to provide encrypted I/O device activities; providing the encrypted I/O device activities to the first device; and, decrypting the encrypted I/O device activities at the first device.

12 Claims, 3 Drawing Sheets

US 9,858,444 B2

SECURING A HUMAN INTERFACE DEVICE INPUT TO WIRELESS DISPLAY DEVICE

BACKGROUND OF THE INVENTION

Field of the Invention

The present invention relates to information handling systems. More specifically, embodiments of the invention relate to securing a human interface device input to a wireless display device.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

It is known to present information generated via an information handling system via a display device such as a wireless display device (also referred to as a wireless monitor). Certain known wireless display devices enable concurrent mirroring of two devices to the same display device along with keyboard/mouse sharing. It is known to communicate with the display device via certain communication standards such as the WIFI-direct communication standard. Often these communication standards can have issues relating to the security of the wireless connection, especially when more than one device is communicating with the same wireless monitor.

SUMMARY OF THE INVENTION

A system, method, and computer-readable medium are disclosed for providing enhanced security to a wireless monitor. In certain embodiments, the enhanced security is over and above the security provided by a wireless communication standard such as the WIFI-direct communication standard. In certain embodiments the enhanced security comprises additional encryption of I/O device communication between the wireless monitor and the I/O device. In certain embodiments, the I/O device comprises at least one of a keyboard and a pointing device. In certain embodiments, the additional encryption of the I/O device communication prevents unauthorized access to passwords that are communicated between the I/O device and the wireless monitor. In various embodiments, the additional encryption for the human interface design (HID) input comprises at least one of a unique monitor generated random encryption key for each Miracast session, is not shared by client devices nor is derived from a PSK of the client devices, and is distributed to the client device in a short time window after the Miracast session is established.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

Figure 1:
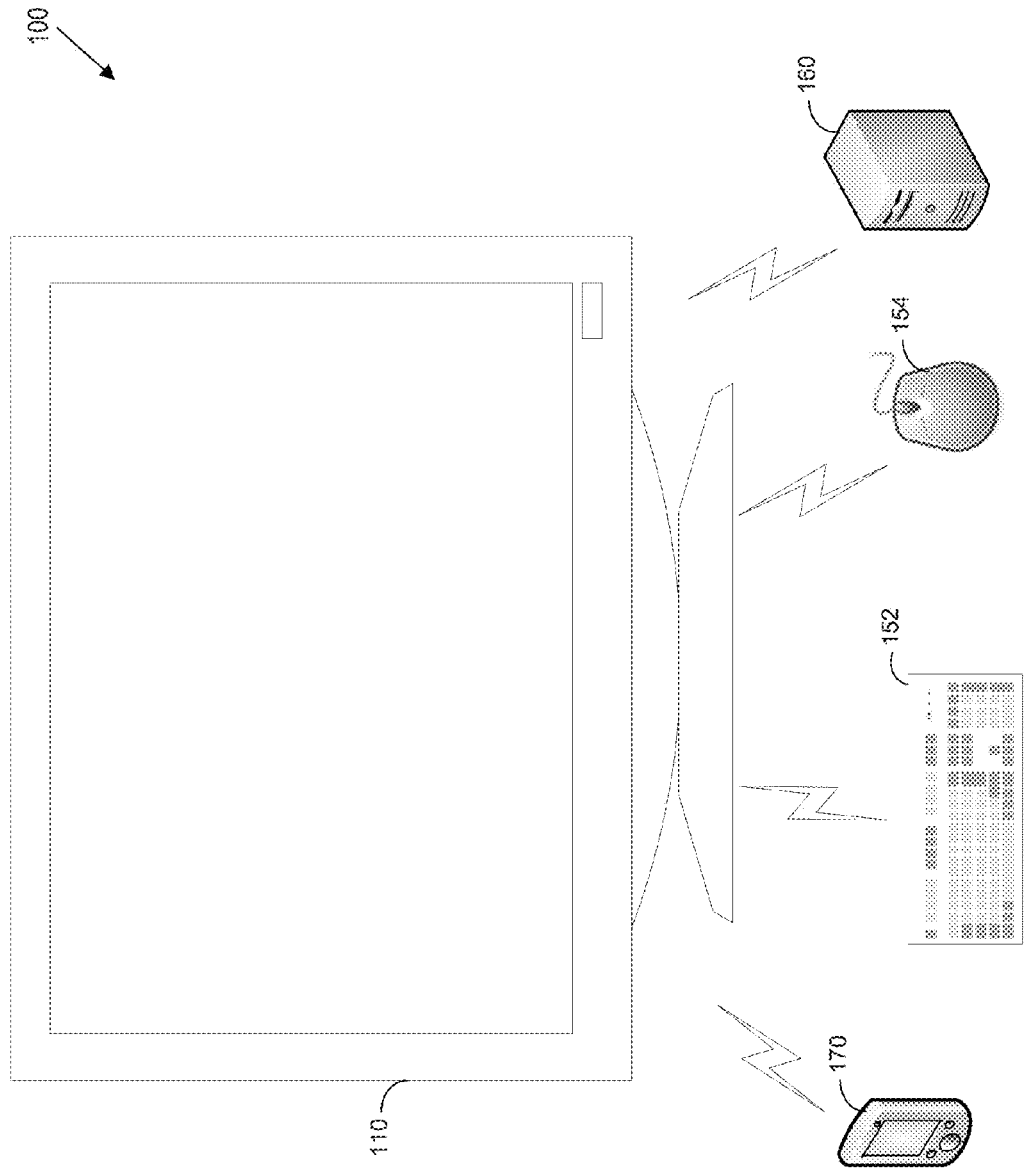
FIG. 1 shows a block diagram of a monitor system in accordance with an embodiment of the present disclosure.

Aspects of the present disclosure include an appreciation that with certain wireless communication standards such as the WIFI-direct communication standard, all devices in the same group share the same pre-shared key (PSK). Due to this sharing a first device (e.g., device A) could potentially monitor (e.g., "sniff") the communication between a second device (e.g., device B) and the display device even after the first device is disconnected the display device. A protection operation (such as a wireless protection setup (WPS) which uses either a personal identification number (PIN) or push button) does not necessarily solve this issue because the first device can legitimately decrypt the PSK if the first device connects to the display device.

Aspects of the present disclosure include an appreciation that a first device should not have an ability to capture communication between a second device and the display device. Having PSK refreshes periodically does not fully address this issue because there is still a time window for hacking into the monitor. Additionally, a more secured communication mechanisms such as WPA2-Enterprise is not feasible as wireless display devices are typically standalone and do not connect directly to a network. Additionally, a wireless monitor executing two independent WIFI-direction sessions with two different PSK is not feasible because of underlying support of industry-standard type system on a chip (SoC) devices and their associated board support package (BSP).

The following description in combination with the Figures is provided to assist in understanding the teachings disclosed herein. The following discussion will focus on specific implementations and embodiments of the teachings. This focus is provided to assist in describing the teachings, and should not be interpreted as a limitation on the scope or applicability of the teachings. However, other teachings can certainly be used in this application. The teachings can also be used in other applications, and with several different types of architectures, such as distributed computing architectures, client/server architectures, or middleware server architectures and associated resources.

For purpose of this disclosure an information handling system can be implemented on one or more information handling system. An information handling system can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system can be a personal computer, a laptop computer, a smart phone, a tablet device or other consumer electronic device, a network server, a network storage device, a switch, a router, or another network communication device, or any other suitable device and may vary in size, shape, performance, functionality, and price. Further, an information handling system can include processing resources for executing machine-executable code, such as a central processing unit (CPU), a programmable logic array (PLA), an embedded device such as a System-on-a-Chip (SoC), or other control logic hardware. An information handling system can also include one or more computer-readable medium for storing machine-executable code, such as software or data. Additional components of an information handling system can include one or more storage devices that can store machine-executable code, one or more communications ports for communicating with external devices, and various input and output (I/O) devices, such as a keyboard, a mouse, and a video display. An information handling system can also include one or more buses operable to transmit information between the various hardware components.

FIG. 1 shows a block diagram an embodiment of a monitor system 100. The monitor system 100 includes a monitor 110 (e.g., a wireless monitor) and also includes one or more peripheral devices such as a keyboard 152 and a pointing device 154 (e.g., a mouse). The monitor system 100 can also include one or more of a computer system 160, and a mobile device 170. The monitor 110 includes various interfaces, including a wireless interface. In various embodiments, the monitor 110 may further include one or more of a media interface and a plurality of I/O interfaces, some or all of which may be USB type interfaces. The media interface represents an audio/video interface for transferring media content (e.g., audio and/or video content) from a host system such as computer system 160 for display on monitor 110, that can include a High Definition Multimedia Interface (HDMI), a Digital Video Interface (DVI), a DisplayPort interface, a Digital Interface for Video and Audio (DIVA) interface, another audio/video interface, or a combination thereof.

In certain embodiments, the monitor 110 may include one or more additional media interfaces. Here, computer system 160 can include any information handling system that is connected to the monitor 110 via a wired media interface and an additional data interface such as I/O interface, as described below, and can include a personal computer system, a laptop computer system, or another information handling system, as needed or desired.

The wireless interface represents a peer-to-peer wireless network interface for transferring media content from a device such as wireless device 170 for presentation on the monitor 110, that can include a wireless interface that is in compliance with a Wi-Fi Direct standard, and can include Wireless Display (WiDi) enabled wireless features, Miracast enabled wireless features, other wireless features, or a combination thereof. In certain embodiments, the monitor 110 includes one or more additional wireless interfaces similar to wireless interface 121. Wireless interface 121 is configured to establish a high capacity connection to monitor 110 for transferring content including media content. In certain embodiments, the wireless interface can further include a backchannel connection from the monitor for receiving information from the monitor. The mobile device 170 can include any information handling system that is coupled to monitor 110 via a wireless interface, and can include a smart phone, a tablet device, or another wireless mobile device, as needed or desired.

In certain embodiments, the monitor 110 operates to select between a mode for the presentation of content from mobile device 170 and a mode for the presentation of content from computer system 160. The skilled artisan will recognize that the method of selecting between the mobile device presentation mode and the computer system presentation mode can include a wide range of methods for making such a selection. For example, the monitor 110 can include a touch panel feature, and a user can select between computer selection and mobile device selection by touching an area of the touch panel that corresponds with the selected field. In another example, a hot key sequence can be associated with keyboard 152 that operates to select one of the computer system mode or the mobile device mode. The skilled artisan will further understand that the teachings of the present disclosure can be applied to multiple input devices to monitor 110, and is not limited to computer system 160 and mobile device 170.

Figure 2:
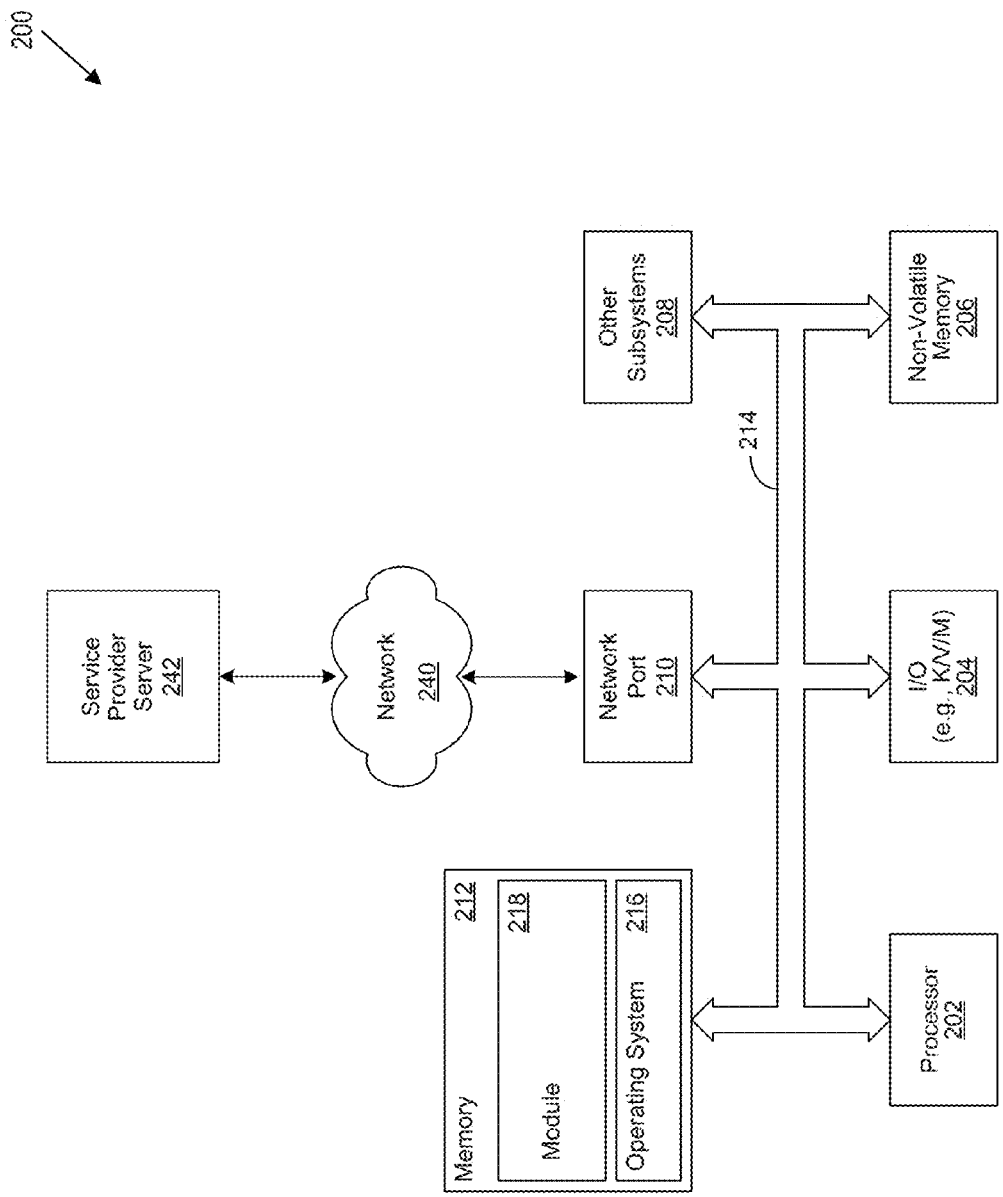
FIG. 2 shows a block diagram of components of an information handling system in accordance with embodiments of the present disclosure.

FIG. 2 is a generalized illustration of an information handling system 200 that can be used to implement the system and method of the present invention. The information handling system 200 includes a processor (e.g., central processor unit or "CPU") 202, input/output (I/O) devices 204, such as a display (e.g., wireless monitor 110), a keyboard (e.g., keyboard 152), a mouse (e.g., mouse 154), and associated controllers, a hard drive or disk storage 206, and various other subsystems 208. In various embodiments, the information handling system 200 also includes network port 210 operable to connect to a network 240, which is likewise accessible by a service provider server 242. The information handling system 200 likewise includes system memory 212, which is interconnected to the foregoing via one or more buses 214. System memory 212 further comprises operating system (OS) 216 and in various embodiments may also comprise security enhancement module 218.

The security enhancement module 218 provides enhanced security to a wireless monitor. In certain embodiments, the enhanced security is over and above the security provided by a wireless communication standard such as the WIFI-direct communication standard. In certain embodiments the enhanced security comprises additional encryption of I/O device communication between the wireless monitor and the I/O device. In certain embodiments, the I/O device comprises at least one of a keyboard and a mouse. In certain embodiments, the additional encryption of the I/O device communication prevents unauthorized access to passwords that are communicated between the I/O device and the wireless monitor. In various embodiments, the additional encryption for the human interface design (HID) input comprises at least one of a unique monitor generated random encryption key for each Miracast session, is not shared by client devices nor is derived from a PSK of the client devices, and is distributed to the client device in a short time window (e.g., a time window of 10-30 seconds) after the Miracast session is established. For the purposes of this disclosure, a Miracast connection may be defined as a peer-to-peer wireless communication connection between a device and a wireless monitor that conforms to a Wi-Fi Direct communication standard. For the purposes of this disclosure a Miracast session may be defined as a peer-to-peer wireless communication session between a device and a wireless monitor that conforms to a Wi-Fi Direct communication standard.

Figure 3:
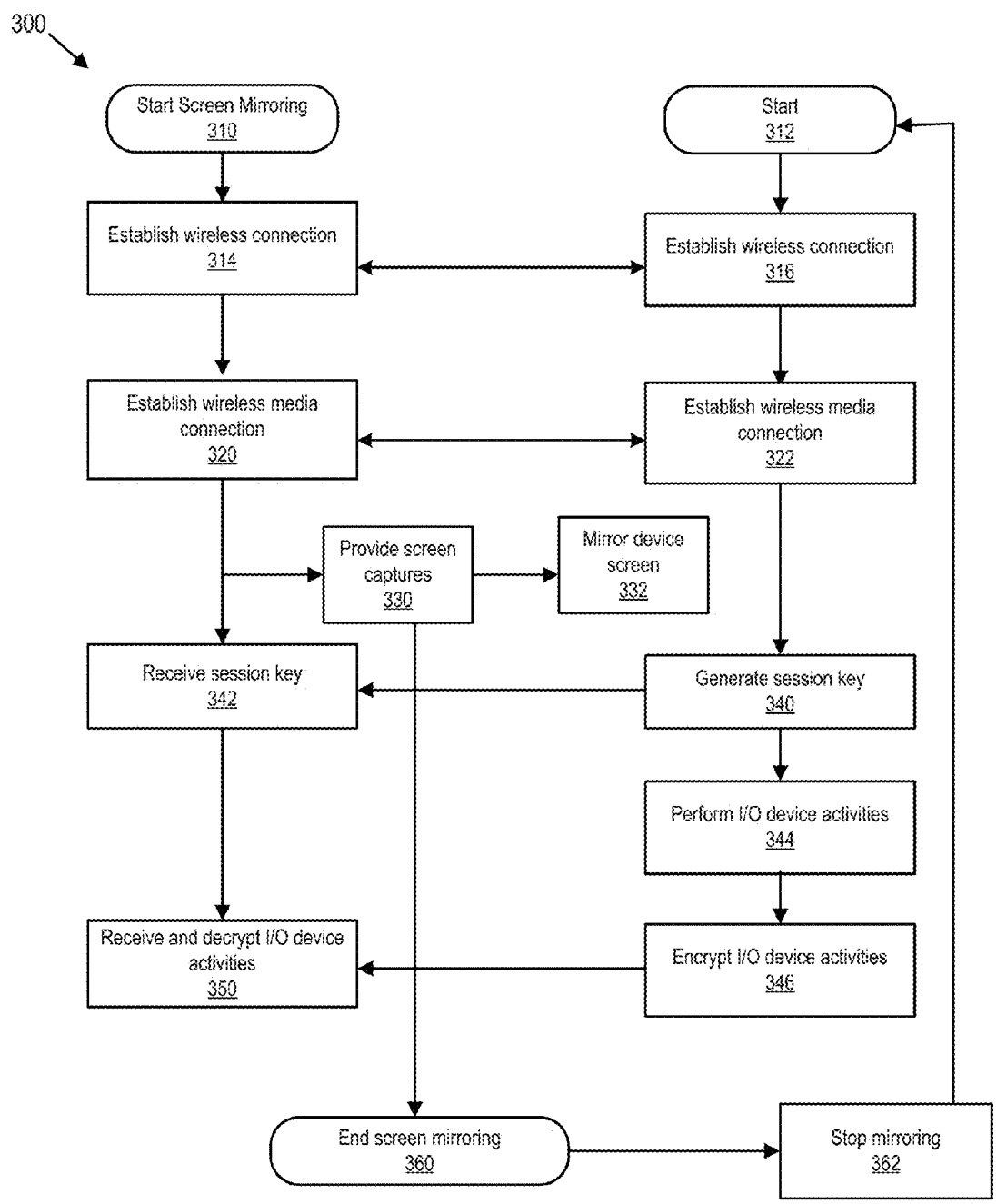
FIG. 3 shows a flow chart of the operation of an enhanced security operation for providing enhanced security to a wireless monitor.

FIG. 3 shows a flow chart of the operation of an enhanced security operation 300 for providing enhanced security to a wireless monitor such as wireless monitor 110. More specifically, the operation begins at step 310 when a user initiates a screen mirroring operation form a first device (e.g., Device A). This first device could include the computer 160 and/or the mobile device 170. Next, at step 312, the wireless monitor starts an enhanced security operation. Next, at steps 314, 316 the first device and the wireless monitor establish a wireless connection such as a Wifi direct connection. In certain embodiments, this wireless connection is established via a 4-way handshake operation. Next, at steps 320, 322, the first device and the wireless monitor establish a wireless media connection session by establishing a wireless media connection. In certain embodiments, the wireless media connection session comprises a Miracast session and the wireless media connection comprises a Miracast session.

Next, at step 330, the first device provides screen captures to the wireless monitor and at step 332 the wireless monitor mirrors the first device screen on the screen of the wireless monitor. Next, at step 340, the wireless monitor generates a session key for HID input. The session key has an associated time window during which the session key may be shared. In various embodiments, the associated time window is a short amount of time (e.g., 1 minute+/−20 seconds) and the session key is only valid for the short amount of time. Next, at step 342, the first device receives the session key for HID input and at step 344 the wireless device allows a user to perform I/O device activities (e.g., keyboard and/or pointing device activities) on the monitor. Next, at step 346, the wireless monitor encrypts the I/O device activities and provides the encrypted activities to the first device. More specifically, in certain embodiments, during step 346, the wireless monitor encrypts keystrokes input from a keyboard using a symmetric key encryption such as AES128/AES256. In certain embodiments, coordinates from mouse activities are similarly encrypted. In certain embodiments, the symmetric key is derived from the session key exchanged in step 342

Next, at step 350, the first device receives and decrypts the I/O device activities. In certain embodiments, the first device decrypts keystrokes using the symmetric key derived from session key exchanged in step 342. The interaction between the first device and the wireless monitor continues until the user ends the screen mirroring operation via the first device at step 360 at which time the wireless device stops mirroring the screen of the first device on the monitor at step 362. In certain embodiments, the session key is periodically refreshed for further security (e.g., steps 340, 342 are repeated periodically (e.g. every 1 minute)).

As will be appreciated by one skilled in the art, the present invention may be embodied as a method, system, or computer program product. Accordingly, embodiments of the invention may be implemented entirely in hardware, entirely in software (including firmware, resident software, microcode, etc.) or in an embodiment combining software and hardware. These various embodiments may all generally be referred to herein as a "circuit," "module," or "system." Furthermore, the present invention may take the form of a computer program product on a computer-usable storage medium having computer-usable program code embodied in the medium.

Any suitable computer usable or computer readable medium may be utilized. The computer-usable or computer-readable medium may be, for example, but not limited to, an electronic, magnetic, optical, electromagnetic, infrared, or semiconductor system, apparatus, or device. More specific examples (a non-exhaustive list) of the computer-readable medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, or a magnetic storage device. In the context of this document, a computer-usable or computer-readable medium may be any medium that can contain, store, communicate, or transport the program for use by or in connection with the instruction execution system, apparatus, or device.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

Embodiments of the invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The present invention is well adapted to attain the advantages mentioned as well as others inherent therein. While the present invention has been depicted, described, and is defined by reference to particular embodiments of the invention, such references do not imply a limitation on the invention, and no such limitation is to be inferred. The invention is capable of considerable modification, alteration, and equivalents in form and function, as will occur to those ordinarily skilled in the pertinent arts. The depicted and described embodiments are examples only, and are not exhaustive of the scope of the invention.

Consequently, the invention is intended to be limited only by the spirit and scope of the appended claims, giving full cognizance to equivalents in all respects.

What is claimed is:

1. A computer-implementable method for providing enhanced security to a wireless monitor, comprising: establishing a connection between the wireless monitor from a first device; generating a session identification for a human interface design (HID) input after the connection is established, the session identification enabling activities of an I/O device to be accepted by the wireless monitor; encrypting the activities of the I/O device to provide encrypted I/O device activities; providing the encrypted I/O device activities to the first device; decrypting the encrypted I/O device activities at the first device; and, establishing a Miracast session between the wireless monitor and the first device after establishing the connection between the wireless monitor and the first device; and wherein the encrypted I/O device activities comprise a unique monitor generated random encryption key for each Miracast session, are not shared by client devices nor is derived from a pre-shared key (PSK) of the first device, and are distributed to the first device during a predetermined time after the Miracast session is established.

2. The method of claim 1, wherein: the connection between the wireless monitor and the first device comprise communications corresponding to a WIFI-direct communication standard.

3. The method of claim 1, wherein: the I/O device comprises at least one of a keyboard and a pointing device.

4. The method of claim 1, wherein: encryption of the I/O device activities prevents unauthorized access to passwords that are communicated between the I/O device and the wireless monitor.

5. A system comprising: a processor; a data bus coupled to the processor; and a non-transitory, computer-readable storage medium embodying computer program code, the non-transitory, computer-readable storage medium being coupled to the data bus, the computer program code interacting with a plurality of computer operations and comprising instructions executable by the processor and configured for: establishing a connection between a wireless monitor and the system; generating a session identification for a human interface design (HID) input after the connection is established, the session identification enabling activities of an I/O device to be accepted by the wireless monitor; encrypting the activities of the I/O device to provide encrypted I/O device activities; providing the encrypted I/O device activities to the system; decrypting the encrypted I/O device activities at the system; and, establishing a Miracast session between the wireless monitor and the system after establishing the connection between the wireless monitor and the first device; and wherein the encrypted I/O device activities comprise a unique monitor generated random encryption key for each Miracast session, are not shared by client devices nor is derived from a pre-shared key (PSK) of the system, and are distributed to the system during a predetermined time after the Miracast session is established.

6. The system of claim 5, wherein: the connection between the wireless monitor and the system comprise communications corresponding to a WIFI-direct communication standard.

7. The system of claim 5, wherein: the I/O device comprises at least one of a keyboard and a pointing device.

8. The system of claim 5, wherein: encryption of the I/O device activities prevents unauthorized access to passwords that are communicated between the I/O device and the wireless monitor.

9. A non-transitory, computer-readable storage medium embodying computer program code, the computer program code comprising computer executable instructions configured for: establishing a connection between the wireless monitor from a first device; generating a session identification for a human interface design (HID) input after the connection is established, the session identification enabling activities of an I/O device to be accepted by the wireless monitor; encrypting the activities of the I/O device to provide encrypted I/O device activities; providing the encrypted I/O device activities to the first device; decrypting the encrypted I/O device activities at the first device; and, establishing a Miracast session between the wireless monitor and the first device after establishing the connection between the wireless monitor and the first device; and wherein the encrypted I/O device activities comprise a unique monitor generated random encryption key for each Miracast session, are not shared by client devices nor is derived from a pre-shared key (PSK) of the first device, and are distributed to the first device during a predetermined time after the Miracast session is established.

10. The non-transitory, computer-readable storage medium of claim 9, wherein: the connection between the wireless monitor and the first device comprise communications corresponding to a WIFI-direct communication standard.

11. The non-transitory, computer-readable storage medium of claim 9, wherein: the I/O device comprises at least one of a keyboard and a pointing device.

12. The non-transitory, computer-readable storage medium of claim 9, wherein: encryption of the I/O device activities prevents unauthorized access to passwords that are communicated between the I/O device and the wireless monitor.

* * * * *